(12) United States Patent
Kambara et al.

(10) Patent No.: US 10,647,571 B2
(45) Date of Patent: May 12, 2020

(54) HYDROGEN GENERATOR

(71) Applicants: Gifu University, Gifu (JP); Sawafuji Electric Co., Ltd., Gunma (JP)

(72) Inventors: Shinji Kambara, Gifu (JP); Tomonori Miura, Gunma (JP); Tatsuya Ikeda, Gunma (JP)

(73) Assignees: Gifu University, Gifu-shi, Gifu (JP); Sawafuji Electric Co., Ltd., Ota-shi, Gumma (JP)

( * ) Notice: Subject to any disclaimer, the term of this patent is extended or adjusted under 35 U.S.C. 154(b) by 0 days.

(21) Appl. No.: 16/312,567

(22) PCT Filed: Mar. 27, 2018

(86) PCT No.: PCT/JP2018/012295
§ 371 (c)(1),
(2) Date: Dec. 21, 2018

(87) PCT Pub. No.: WO2018/198635
PCT Pub. Date: Nov. 1, 2018

(65) Prior Publication Data
US 2019/0322526 A1 Oct. 24, 2019

(30) Foreign Application Priority Data

Apr. 28, 2017 (JP) .................................. 2017-089365

(51) Int. Cl.
*C01B 3/04* (2006.01)
*C01B 3/58* (2006.01)
(Continued)

(52) U.S. Cl.
CPC .............. *C01B 3/047* (2013.01); *B01D 53/22* (2013.01); *B01J 21/04* (2013.01); *B01J 21/10* (2013.01); *C01B 3/58* (2013.01); *H01M 8/0656* (2013.01)

(58) Field of Classification Search
None
See application file for complete search history.

(56) References Cited

U.S. PATENT DOCUMENTS

| 3,730,774 A | 5/1973 | McKee et al. |
| 5,811,062 A | 9/1998 | Wegeng et al. |
| (Continued) | | |

FOREIGN PATENT DOCUMENTS

| CN | 1861519 | 11/2006 |
| JP | 2004359508 | 12/2004 |
| (Continued) | | |

*Primary Examiner* — Kishor Mayekar
(74) *Attorney, Agent, or Firm* — Peacock Law P.C.; Janeen Vilven; Justin R. Muehlmeyer

(57) ABSTRACT

Provided is a hydrogen generating apparatus adaptable to fluctuating hydrogen demand, particularly by enabling large-scale hydrogen production, generating pure hydrogen at a high yield. The hydrogen generating apparatus 1 generates hydrogen gas from a source gas by decomposing the source gas through catalysis and transforming it into plasma through electric discharge. The hydrogen generating apparatus 1 includes a dielectric body 2 defining a source gas flow channel 13, a catalyst 10 that decomposes at least part of the source gas in the source gas flow channel 13 to generate hydrogen gas, an electrode 3 contacting the dielectric body 2, a hydrogen separation membrane 5 facing the electrode 3 across the dielectric body 2, a hydrogen flow channel 18 guiding hydrogen separated by the hydrogen separation membrane 5, and a high-voltage power supply 6 supplying power to cause electric discharge between the hydrogen separation membrane 5 and the electrode 3.

5 Claims, 4 Drawing Sheets

(51) Int. Cl.
*B01D 53/22* (2006.01)
*B01J 21/04* (2006.01)
*B01J 21/10* (2006.01)
*H01M 8/0656* (2016.01)

(56) References Cited

U.S. PATENT DOCUMENTS

2014/0305790 A1* 10/2014 Deveau ............... B01D 53/12
 204/157.15
2019/0135621 A1 5/2019 Kambara et al.

FOREIGN PATENT DOCUMENTS

| JP | 2008536796 | 9/2008 |
| JP | 2013078716 | 5/2013 |
| JP | 2014070012 | 4/2014 |
| JP | 2017042734 A | 3/2017 |
| JP | 2017042735 | 3/2017 |

* cited by examiner

HYDROGEN GENERATOR

FIELD OF THE INVENTION

The present invention generally relates to hydrogen generating apparatuses, and more particularly relates to a hydrogen generating apparatus with a high yield of hydrogen, and which is able to easily control the amount of hydrogen produced.

BACKGROUND ART

There is a demand for technology that can generate hydrogen of a high purity and supply it in a stable manner as fuel for a fuel cell. Steam reforming of hydrocarbon gas is an example of a known method for generating hydrogen. But in such steam reforming of hydrocarbon gas, when the mole ratio of steam to raw material becomes low, coking of the carbon on the catalyst occurs, which deactivates the catalyst. The production conditions must therefore be carefully controlled corresponding to the amount of hydrogen to be produced.

Another known method for generating hydrogen is to decompose ammonia using a catalyst. However, although it is possible to generate hydrogen from decomposed ammonia when using such an ammonia-decomposing catalyst, it is not possible to separate the hydrogen from the mixed gas consisting of ammonia, hydrogen, and nitrogen obtained by decomposing the ammonia.

The inventors invented a method and apparatus for generating hydrogen by transforming ammonia into plasma by electric discharge, which is disclosed in Patent Document 1. Patent Document 1 discloses a hydrogen generating apparatus including a plasma reactor, a high-voltage electrode, and a grounding electrode. In the hydrogen generating apparatus of Patent Document 1, a hydrogen separation membrane functions as the high-voltage electrode, which causes a dielectric barrier discharge between the hydrogen separation membrane and the grounding electrode at room temperature and atmospheric pressure, whereby the ammonia in a feed gas is transformed into plasma to generate high-purity hydrogen. By using the hydrogen separation membrane for electric discharge, separation of high-purity hydrogen from the mixed gas can be performed at room temperature and atmospheric pressure.

In the hydrogen generating apparatus using plasma electric discharge as described in Patent Document 1, it was necessary to increase the electric power for uniform plasma transformation of the raw material in the cylindrical reactor in accordance with the capacity of the reactor. Larger reactors could thus actually be less energy efficient than smaller reactors, which came with a risk of low hydrogen yield and reduced energy efficiency when there was a need for large-scale production of hydrogen.

PRIOR ART DOCUMENTS

Patent Document 1: Japanese Unexamined Patent Application Publication No. 2014-70012.

SUMMARY OF THE INVENTION

Problem to be Solved by the Invention

The present invention was made in view of the aforementioned circumstances, and has an object of providing a hydrogen generating apparatus capable of easily controlling the amount of hydrogen generated, and also of generating high-purity hydrogen with a consistently high yield.

Means for Solving the Problem

The hydrogen generating apparatus according to an embodiment of the present invention is characterized in that it includes a dielectric body defining a source gas flow channel, a catalyst that decomposes at least a portion of the source gas flowing in the source gas flow channel to generate hydrogen gas, an electrode arranged in contact with the dielectric body, a hydrogen separation membrane facing the electrode across the dielectric body, a hydrogen flow channel that guides hydrogen separated by the hydrogen separation membrane, and a high-voltage power supply that supplies electric power to cause electric discharge between the hydrogen separation membrane and the electrode.

The hydrogen generating apparatus according to the embodiment of the present invention generates hydrogen gas from a source gas with a high yield through the action of both the catalyst and the electric discharge between the hydrogen separation membrane and the electrode.

The hydrogen generating apparatus according to the embodiment of the present invention may take an aspect in which the source channel is formed as a groove in the surface of a tabular dielectric body, the groove opening of the source gas flow channel is covered by a thin tabular catalyst, and the hydrogen separation membrane is laminated on the thin tabular catalyst. The hydrogen separation membrane separates hydrogen generated from the source gas by electric discharge or catalyst reaction and introduces the hydrogen into the hydrogen flow channel.

The hydrogen generating apparatus according to the embodiment of the present invention may also take an aspect in which the dielectric body is cylindrical, the electrode is arranged on the outside of the dielectric body, and the hydrogen separation membrane is formed as a cylinder arranged on the inside of the dielectric body concentrically with the dielectric body, thereby defining the source gas flow channel between the dielectric body and the hydrogen separation membrane. The catalyst may be arranged in the source gas flow channel in a position upstream of the hydrogen separation membrane. The hydrogen separation membrane separates hydrogen generated from the source gas by electric discharge or catalyst reaction and introduces the hydrogen into the hydrogen flow channel.

In the hydrogen generating apparatus according to the embodiment of the present invention, the source gas is preferably ammonia.

Effects of the Invention

The hydrogen generating apparatus according to the embodiment of the present invention is capable of decomposing at least a portion of the source gas through catalysis to generate hydrogen gas, and further of transforming remaining source gas into plasma by electric discharge between the hydrogen separation membrane and the electrode to generate hydrogen gas. By the effects of both the catalyst and the electric discharge, hydrogen gas is generated from the source gas at a high yield.

By taking an aspect in which the source gas flow channel formed as a groove is covered by the catalyst, the hydrogen generating apparatus according to the embodiment of the present invention can efficiently decompose the source gas by catalysis to generate hydrogen gas while the source gas is passing through the groove. In addition, by stacking the catalyst and the hydrogen separation membrane, it is possible to cause an electric discharge in a direction crossing the flow direction of the source gas in the source gas flow channel between the hydrogen separation membrane and the electrode. Since the source gas is transformed into plasma by the electric discharge in a uniform manner, hydrogen gas can be generated at a consistently high yield regardless of the flow rate of the source gas.

In addition, with the catalyst arranged upstream of the hydrogen separation membrane, the hydrogen generating apparatus according to the embodiment of the present invention is capable of generating hydrogen gas at a higher yield than in the conventional art, by transforming a greater portion of the source gas in the flow channel into hydrogen gas through catalysis, and further transforming source gas into plasma by electric discharge. In a case where 95% or more of the source gas has been decomposed by catalysis to generate hydrogen gas, almost 100% of the remaining source gas is decomposed by being transformed into plasma by electric discharge. As the gas discharged from the generating apparatus does not contain any remnants of source gas, there is no need to provide a recovery treatment means for the source gas.

The dielectric body, catalyst, electrode, hydrogen separation membrane, and hydrogen flow channel of the hydrogen generating apparatus according to the embodiment of the present invention may be integrated into a single module. Combining several hydrogen generating apparatuses in parallel allows for flexible handling of changes in the amount of hydrogen to be supplied, and also eases conditions for suitable places of installation.

The hydrogen generating apparatus according to the embodiment of the present invention employs a hybrid (mixed) method of generating hydrogen gas through plasma transformation and generating hydrogen gas through catalysis, which gives a high hydrogen yield and enables high-capacity hydrogen generation.

With the catalyst arranged in the interior of the plasma reactor, the hydrogen generating apparatus according to the embodiment of the present invention allows for the hitherto unutilized heat generated in the plasma reactor to be utilized in the operation of the ammonia-decomposing catalyst, resulting in increased energy efficiency. A heater or other heating means may also be used to heat the catalyst. Waste heat can also be more efficiently utilized by providing the plasma reactor with an insulating structure. Since ammonia decomposition is an endothermic reaction, decomposition is facilitated by heating.

Ammonia-decomposing catalysts have an operating temperature range of 150° C. to 600° C., and it takes time for the ammonia decomposition to begin. In addition, autonomous startup and running is not possible. However, with the plasma-based hydrogen generating method of the hydrogen generating apparatus according to the embodiment of the present invention, the process begins quickly, and autonomous startup and running is possible. The hydrogen generating apparatus uses a hybrid method of generating hydrogen through plasma transformation and catalysis. Initially, only plasma transformation is initiated to generate hydrogen from ammonia. When the catalyst temperature in the plasma reactor becomes 150° C. or higher, the ammonia-decomposing catalyst is activated, the amount of ammonia decomposed by the catalyst increases in proportion to the increase in temperature, and control of the amount of hydrogen generated is facilitated, allowing for high-capacity production. This expands the applicable scope of the apparatus, such as installation in fuel cell driven vehicles.

DESCRIPTION OF THE EMBODIMENTS

Figure 1:
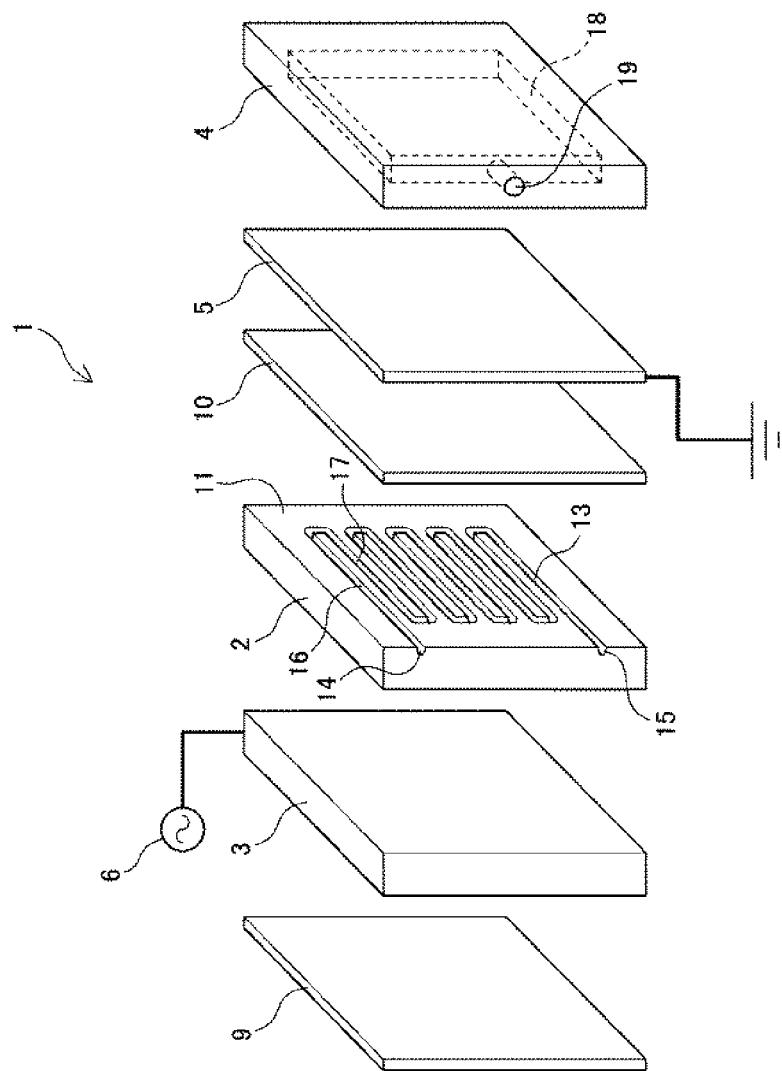
FIG. 1 is an exploded perspective view of the hydrogen generating apparatus according to Example 1 of the present invention.

The hydrogen generating apparatus according to the embodiment of the present invention employs a hybrid (mixed) method of generating hydrogen gas through plasma transformation and through catalysis, and supplies heat caused by Joule heating and dielectric heating in the plasma reactor to the catalyst arranged inside the same plasma reactor. The heat generated in the plasma reactor, which until now had gone to waste as heat loss, can be utilized in the operation of the ammonia-decomposing catalyst, thereby increasing energy efficiency. Heating means such as a heater may be used for heating the catalyst. The plasma reactor can also be provided with an insulating structure. Since the ammonia decomposition is an endothermic reaction, decomposition is facilitated by heating.

The hydrogen generating apparatus according to the embodiment of the present invention generates hydrogen from ammonia through plasma transformation at room temperature and atmospheric pressure on startup, and starts up and runs autonomously. As the operating temperature range of the catalyst is 150° C. to 600° C., the ammonia-decomposing catalyst is activated once the catalyst temperature in the plasma reactor becomes 150° C. or higher, after which the amount of ammonia decomposed by the catalyst increases in proportion to the increase in temperature, which facilitates control of the amount of hydrogen generated, allowing for high-capacity production.

Another preferred embodiment of the hydrogen generating apparatus according to the present invention is described below.

(1) The source gas preferably used in the hydrogen generating apparatus may be ammonia, urea, or a hydrocarbon gas such as methane, or a mixture of ammonia and an inert gas rather than only ammonia. Ammonia gas from liquid ammonia or urea, or a mixture of such ammonia with an inert gas, may also be used.

(2) The catalyst is preferably an ammonia-decomposing catalyst in which a catalyst metal such as nickel or ruthenium is supported on magnesium oxide (MgO) or alumina ($Al_2O_3$).

(3) When the hydrogen separation membrane is connected to the high-voltage power supply, it functions as a high-voltage electrode. When the hydrogen separation membrane is a high-voltage electrode, an opposite electrode on the other side of the dielectric body is grounded and functions as a grounding electrode.

(4) When the hydrogen separation membrane is grounded, it functions as a grounding electrode. When the hydrogen separation membrane is a grounding electrode, the opposite electrode on the other side of the dielectric body functions as a high-voltage electrode connected to the high-voltage power supply.

(5) The high-voltage electrode and the grounding electrode are configured to face each other across the dielectric body and transform the source gas in the source gas flow channel into atmospheric pressure non-equilibrium plasma through dielectric barrier discharge. The high-voltage power supply applies a bipolar pulse waveform to the high-voltage electrode.

(6) The dielectric body is formed of glass such as quartz glass, a ceramic such as alumina, or a highly insulating resin such as barium titanate, polycarbonate, or acryl.

(7) A palladium alloy film may be preferably used as the hydrogen separation membrane.

(8) The space demarcated by a hydrogen flow channel plate and the hydrogen separation membrane may be used as the hydrogen flow channel.

(9) A space formed in the hydrogen separation membrane and a supporting medium supporting the hydrogen separation membrane may be used as the hydrogen flow channel.

EXAMPLES

Example 1

A preferable example of the hydrogen generating apparatus according to the present invention is described below with reference to the drawings. FIG. 1 is a schematic exploded perspective view of a hydrogen generating apparatus 1 according to the present example of the invention. The hydrogen generating apparatus 1 includes a dielectric body 2, an electrode 3, a hydrogen flow channel plate 4, a hydrogen separation membrane 5, a high-voltage power supply 6, an insulating spacer 9, and a catalyst 10. In the following descriptions, the surfaces of the elements shown on the right side of FIG. 1 will be referred to as the right side surfaces, and the surfaces of the elements shown on the left side will be referred to as the left side surfaces.

The dielectric body 2 is made of quartz glass and has a first surface 11 shown as the right side surface in FIG. 1, and a second surface that is generally parallel to the first surface 11. In the first surface 11 of the dielectric body 2 there is formed a source gas flow channel 13 in the form of a groove having an opening at the right side surface. The shape of the source gas flow channel 13 can be decided with consideration to the flow rate of the source gas and the voltage to be applied to the source gas. FIG. 1 shows an example in which the source gas flow channel 13 has a channel section 16 that is in communication with a source gas flow channel inlet 14 and extends linearly parallel to a top surface of the dielectric body 2, and a return channel section 17 which extends backward parallel to the channel section 16. A plurality of these channel sections 16 and return channel sections 17 are alternately connected at a uniform distance.

The electrode 3 is a tabular electrode arranged so as to face the second surface shown as the left side surface of the dielectric body 2. The electrode 3 is connected to the high-voltage power supply 6 and functions as a high-voltage electrode. The insulating spacer 9 is arranged on the left side of the electrode 3.

The catalyst 10 is formed on a thin plate and arranged so as to face the first surface 11 of the dielectric body 2. The catalyst 10 covers the source gas flow channel 13 and the dielectric body 2 and the catalyst 10 define a wall surface including a closed cross-section of the source gas flow channel 13. The catalyst 10 employs an ammonia-decomposing catalyst consisting of a catalyst metal such as nickel or ruthenium supported on magnesium oxide or alumina and formed in a tabular shape. The catalyst decomposes at least a portion of the source gas flowing in the source gas flow channel 13 to generate hydrogen. Hydrogen molecules are separated into hydrogen atoms through dielectric barrier discharge, and the hydrogen atoms are adsorbed onto the hydrogen separation membrane surface to pass through the hydrogen separation membrane 5.

The hydrogen separation membrane 5 is a thin film with an area about equal to that of the right side surface of the catalyst 10, and is laminated on the right side surface of the catalyst 10. The hydrogen separation membrane 5 is grounded and functions as a grounding electrode. The hydrogen separation membrane 5 may be formed as a palladium alloy film, a zirconium-nickel (Zr—Ni) alloy film, a vanadium-nickel (V—Ni) alloy film, a niobium-nickel (Nb—Ni) alloy film, or a film consisting of an alloy of one or more metals of the group consisting of niobium (Nb), nickel (Ni), cobalt (Co), and molybdenum (Mo) with one or more metals of the group consisting of vanadium (V), titanium (Ti), zirconium (Zr), tantalum (Ta), and hafnium (Hf). For the hydrogen separation membrane 5 in the present example a palladium alloy film may particularly preferably be used. The hydrogen separation membrane 5 may be formed as a single layer film consisting of the aforementioned metals, or a laminate of two or more metals selected from the aforementioned metals. It is also possible to use a non-metallic hydrogen separation membrane such as a silica-based film, a zeolite-based film, a polyamide-based film, or a polysulfone-based film, but in such case a sturdier supporting medium must be bonded to the hydrogen separation membrane 5 to maintain its shape.

The hydrogen flow channel plate 4 is a tabular member including a hydrogen flow channel 18 open on the left side surface, and a hydrogen outlet 19 in communication with the hydrogen flow channel 18. The hydrogen flow channel plate 4 is arranged on the right side of the hydrogen separation membrane 5 so as to sandwich the catalyst 10 and the hydrogen separation membrane 5 between the dielectric body 2 and the hydrogen flow channel plate 4. The hydrogen flow channel 18 of the hydrogen flow channel plate 4 is provided at a position facing the source gas flow channel 13 of the dielectric body 2, and its left side surface opening is closed off by the hydrogen separation membrane 5.

In the present example, the high-voltage power supply 6 is connected to and applies a high voltage to the electrode 3. The high-voltage power supply 6 generates an extremely short bipolar pulse waveform with a retention time of 10 µs to supply electrical power with a high electronic energy density.

The dielectric body 2, electrode 3, hydrogen flow channel plate 4, hydrogen separation membrane 5, and catalyst 10 that constitute the hydrogen generating apparatus 1 may be configured in rectangular shapes with generally identical height and depth measurements, giving the hydrogen generating apparatus 1 an approximately cuboidal shape. The components of such a hydrogen generating apparatus 1 may be stacked in this manner and then coupled firmly together using nuts and bolts. In cases where it is especially necessary to seal the source gas flow channel 13 and hydrogen flow channel 18 to ensure airtightness, gaskets or sealant may be additionally provided.

In the hydrogen generating apparatus 1 according to the present example, ammonia is most preferably used as the raw material. The reaction formula when using ammonia as the raw material to generate hydrogen is as shown in Formula 1 below.

$$2NH_3 + e \rightarrow N_2 + 3H_2 + e \quad \text{(Formula 1)}$$

A method for generating hydrogen with the hydrogen generating apparatus 1 using ammonia as the source gas will now be described. A raw material feed means (not shown) includes a flow velocity control means that controls the flow velocity of the source gas, whereby source gas is fed via the source gas flow channel inlet 14 of the dielectric body 2 to the source gas flow channel 13 at a predetermined velocity. The catalyst 10 reaches its operating temperature by means of heat generated in the plasma reactor or a heating means such as a heater, and decomposes at least a portion of the source gas flowing in the source gas flow channel 13 to generate hydrogen. The generated hydrogen passes through the catalyst 10 and is adsorbed onto the hydrogen separation membrane 5, inside of which the hydrogen scatters as it passes through until it reaches the hydrogen flow channel 18 of the hydrogen flow channel plate 4, where the hydrogen atoms recombine into hydrogen molecules.

The high-voltage power supply 6 applies a voltage to the electrode 3 to cause a dielectric barrier discharge between the hydrogen separation membrane 5 and the electrode 3. This discharge transforms the ammonia remaining in the source gas flow channel 13 into atmospheric pressure non-equilibrium plasma. The atmospheric non-equilibrium plasma of ammonia passes through the catalyst 10, exposing the hydrogen separation membrane 5 to the plasma. The hydrogen generated from the plasma is adsorbed onto the hydrogen separation membrane 5 in the form of hydrogen atoms like the hydrogen generated by catalysis, and scatter as they pass through the hydrogen separation membrane 5 until they reach the hydrogen flow channel 18 of the hydrogen flow channel plate 4, where they recombine into hydrogen molecules. In this way, the hydrogen separation membrane 5 transmits only hydrogen to the hydrogen flow channel 18, thereby separating the hydrogen.

Through sufficient control of the flow velocity of the ammonia flowing through the source gas flow channel 13, time for the ammonia to contact the catalyst and be exposed to the electric discharge can be secured, making it possible to separate almost 100% of the hydrogen contained in the ammonia and guide the hydrogen into the hydrogen flow channel 18. Since the obtained hydrogen-containing gas has a purity of at least 99.999%, it can be used in a fuel cell as is.

The operating temperature range of the catalyst 10 is about 150° C. to 600° C., and the decomposition rate of the ammonia increases in proportion to the temperature. As the temperature of the catalyst 10 increases, so does the temperature of the obtained hydrogen-containing gas. The obtained hydrogen-containing gas can be supplied to a fuel cell that operates at high temperatures, such as a phosphoric acid fuel cell (PAFC), a molten carbonate fuel cell (MCFC), or a solid oxide fuel cell (SOFC).

By combining a plurality of hydrogen generating apparatuses 1 according to the present Example in parallel and simultaneously feeding source gas to each hydrogen generating apparatus 1, each hydrogen generating apparatus 1 can generate hydrogen of a high purity at a high yield. In addition, by controlling the number of hydrogen generating apparatuses 1 to which source gas is fed, it is possible to easily control the amount of hydrogen generated. Further, the generally cuboidal shape of each hydrogen generating apparatus 1 offers a high degree of freedom in terms of stacking the apparatuses on top of one another or arranging them in parallel, making it easy to make changes to the general arrangement.

Example 2

Figure 2:
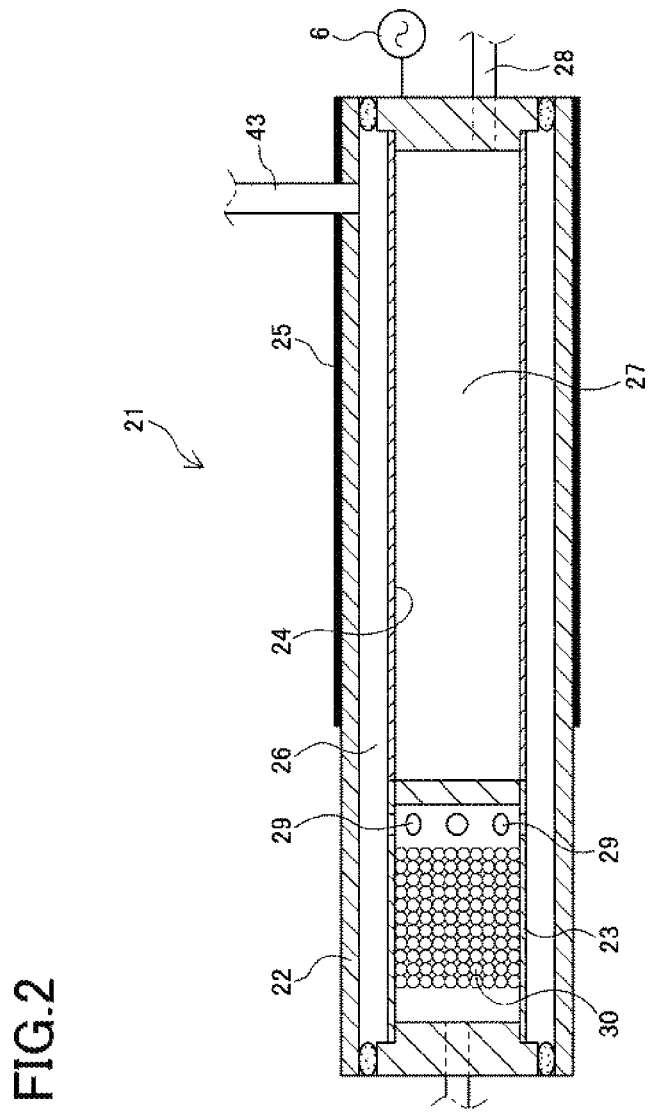
FIG. 2 is a vertical cross-sectional view of the hydrogen generating apparatus according to Example 2 of the present invention.

FIG. 2 shows a hydrogen generating apparatus 21 according to the present Example. The hydrogen generating apparatus 21 includes a plasma reactor chamber 22 made of quartz glass, which is a dielectric body, which houses a catalyst tube 23 containing a catalyst, and a hydrogen separation membrane 24 in the form of a palladium alloy film shaped like a cylinder. The catalyst tube 23 and the hydrogen separation membrane 24 according to the present Example are formed with about equal diameters and are connected in series, and are arranged concentrically with respect to the plasma reactor 22. A source gas flow channel 26 is defined between the inner surface of the plasma reactor 22 and the outer surface of the catalyst tube 23 and the hydrogen separation membrane 24. The cylindrical space inside the hydrogen separation membrane 24 forms a hydrogen flow channel 27.

A grounding electrode 25 is arranged in contact with the outside of the plasma reactor 22. In the present Example, the hydrogen separation membrane 24 is connected to the high-voltage power supply 6 and functions as a high-voltage electrode. As in Example 1, the high-voltage power supply 6 generates an extremely short bipolar pulse waveform with a retention time of 10 µs to supply electrical power with a high electronic energy density to the hydrogen separation membrane 24. When a high voltage is applied to the hydrogen separation membrane 24, the source gas flow channel 26 between the inner surface of the plasma reactor 22 and the hydrogen separation membrane 24 becomes an electric discharge space, in which a dielectric barrier discharge occurs in a direction perpendicular to the direction in which the source gas flows.

The catalyst tube 23 according to the present Example is formed of a nickel-chromium alloy, which is a resistance heating element. The interior of the catalyst tube 23 is filled with an ammonia-decomposing catalyst 30 in the form of pellets (with a grain size of 3 to 5 mm) made of a catalyst metal such as nickel or ruthenium supported on magnesium oxide (MgO) or alumina ($Al_2O_3$).

A method for generating hydrogen with the hydrogen generating apparatus 21 using ammonia as the source gas will now be described. Ammonia is introduced into the catalyst tube 23 connected upstream of the hydrogen separation membrane 24. The catalyst tube 23 is heated to a temperature of about 500° C. by the heat generated in the plasma reactor or by a heating means such as a heater. The ammonia is decomposed by the catalyst 30 in the catalyst tube 23, whereby the source gas becomes a mixed gas of hydrogen gas, nitrogen gas, and ammonia gas, which is introduced into the source gas flow channel 26 through a plurality of holes 29 provided in the side of the catalyst tube 23. By optimizing the flow rate and flow path of the source gas passing through the catalyst tube 23, and the temperature conditions of the catalyst, 95% or more of the ammonia can be decomposed by the catalyst.

A dielectric barrier discharge in the source gas flow channel 26 between the inner surface of the plasma reactor 22 and the hydrogen separation membrane 24 transforms the ammonia in the source gas into atmospheric pressure non-equilibrium plasma, generating hydrogen gas. When the source gas with 95% or more of the ammonia in the source gas decomposed by the catalyst transforms into plasma, the remaining ammonia decomposes completely to yield hydrogen gas. The hydrogen gas passes through the hydrogen separation membrane 24 and moves into the hydrogen flow channel 27 inside of the hydrogen separation membrane 24, and is then supplied to an external unit through a hydrogen outlet 28. With the hydrogen gas separated, the source gas now consists of nitrogen gas, which is discharged through a source gas outlet 43.

Figure 4:
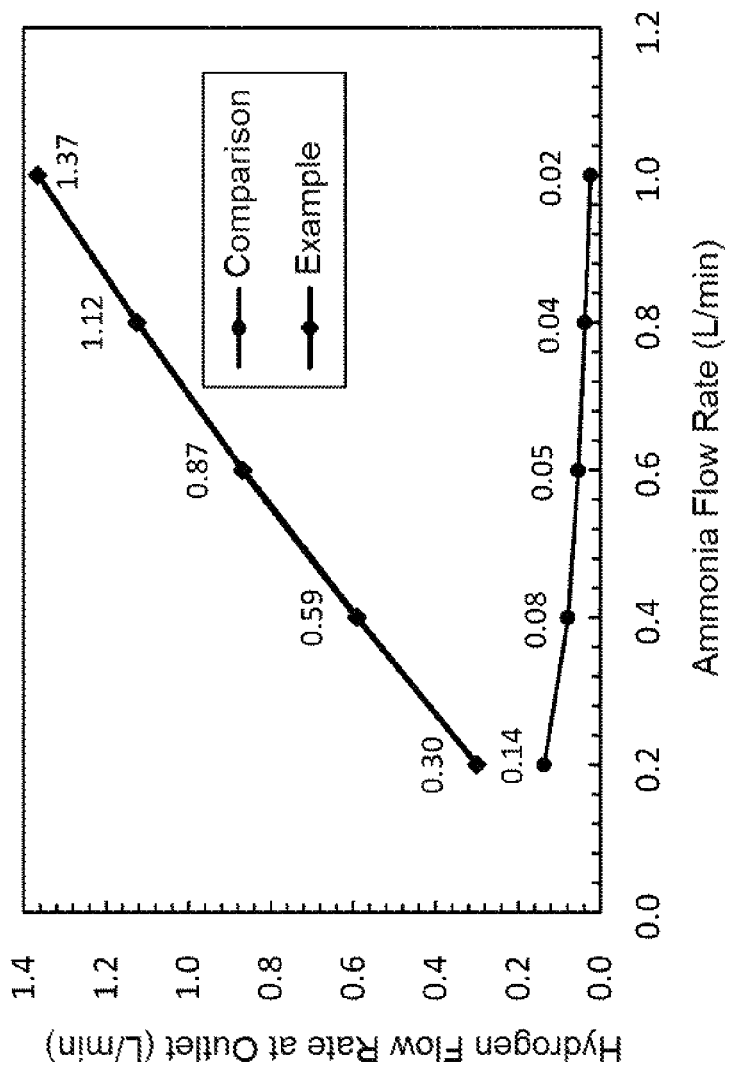
FIG. 4 shows the difference in generated hydrogen quantity relative to ammonia gas flow rate of the hydrogen generating apparatus according to the embodiment of the present invention compared to a conventional example.

FIG. 4 is a graph showing the change in the amount of hydrogen generated relative to the amount of ammonia fed to the hydrogen generating apparatus 21. The hydrogen generating apparatus 21 in which the amount of hydrogen generated was measured had a catalyst consisting of ruthenium as the catalyst metal supported on magnesium oxide, and was heated to 400° C. The source gas was 100% ammonia gas, and the flow rate at the hydrogen outlet 43 was measured as the flow rate of the source gas was changed from 0.2 to 1.0 L/min. The space velocity (SV, a value expressed as source gas flow velocity ($m^3$/h)÷catalyst volume ($m^3$)) at this time was 334 to 1670 $h_{-1}$. As a comparative example, the amount of hydrogen generated when feeding ammonia to the cylindrical hydrogen generating apparatus of Patent Document 1 under the same conditions is shown. Both hydrogen generating apparatuses yielded hydrogen of a very high purity; 99.999%. On the other hand, as can be seen in FIG. 4, it was confirmed that the hydrogen generating apparatus 1 according to the present Example can generate hydrogen at a constantly high yield compared to the comparative example, generally in proportion to the flow rate of the ammonia, and is thus suitable for hydrogen production at a larger scale.

Example 3

Figure 3:
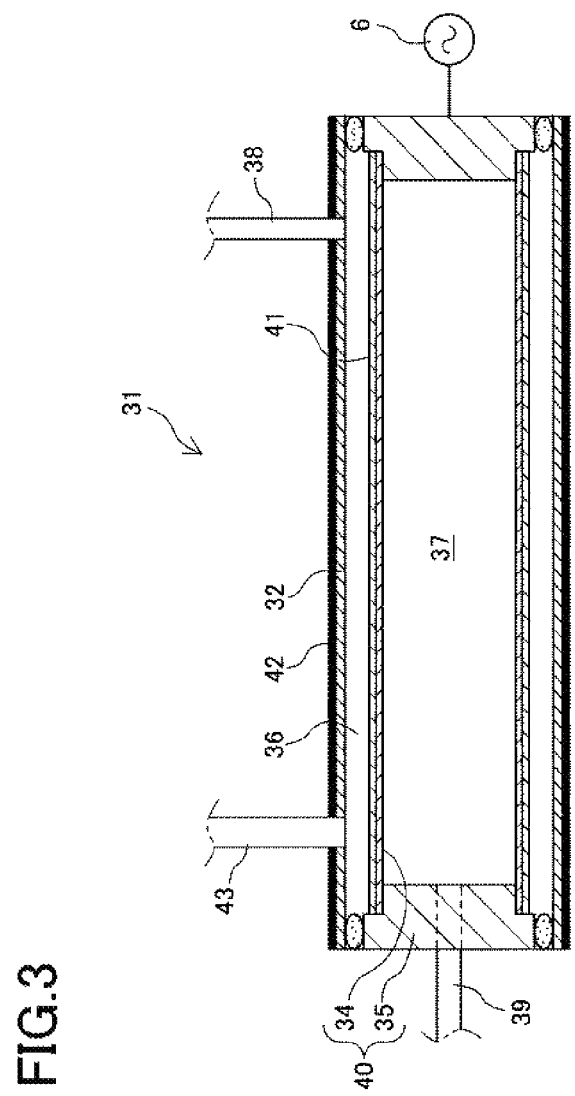
FIG. 3 is a vertical cross-sectional view of the hydrogen generating apparatus according to Example 3 of the present invention.

FIG. 3 shows a hydrogen generating apparatus 31 according to the present Example. The hydrogen generating apparatus 31 includes a plasma reactor 32, a high-voltage electrode 40 housed within the plasma reactor 32, and a grounding electrode 42 arranged so as to cover the outside of the plasma reactor 32. The plasma reactor 32 is made of quartz glass, formed in a cylindrical shape, and functions as a dielectric body. The high-voltage electrode 40 includes a cylindrical hydrogen separation membrane 34 and disc-shaped supports 35 that support the ends of the hydrogen separation membrane 34. A palladium alloy film is a preferred material of the hydrogen separation membrane 34. The high-voltage electrode 40 is connected to the high-voltage power supply 6, which applies a high voltage to the high-voltage electrode 40.

Outside of the hydrogen separation membrane 34 is arranged a catalyst 41 in the form of a sheet covering the hydrogen separation membrane 34. The catalyst 41 is formed of an ammonia-decomposing catalyst consisting of a catalyst metal such as nickel or ruthenium supported on magnesium oxide or alumina.

The hydrogen separation membrane 34 and the catalyst 41 are arranged concentrically with respect to an inner wall of the plasma reactor 32, and a source gas flow channel 36 is formed between the inner wall of the plasma reactor 32 and the catalyst 41, maintaining a constant distance. Inside of the hydrogen separation membrane 34 there is formed a hydrogen flow channel 37 that is enclosed by the hydrogen separation membrane 34 and the supports 35 as a sealed space.

In the present Example, the source gas is ammonia, which is fed as ammonia gas through a source gas inlet 38 to the source gas flow channel 36. The catalyst 41 defining the source gas flow channel 36 is heated by the heat generated in the plasma reactor, and decomposes part of the ammonia passing through the source gas flow channel 36 to generate hydrogen gas.

Meanwhile, the hydrogen separation member 34, to which the high-voltage power supply 6 applies the high voltage, causes a dielectric barrier discharge in the source gas flow channel 36. This discharge transforms remaining ammonia not decomposed by the catalyst 41 into plasma. The hydrogen separation membrane 34 is exposed to the plasma passing through the catalyst 41. The hydrogen gas generated from the source gas through the dielectric discharge or catalysis by the catalyst 41 is transmitted through the hydrogen separation membrane 34 and introduced into the hydrogen flow channel 37, and is then supplied to an external unit through the hydrogen outlet 39. The source gas after the hydrogen gas has been separated consists of nitrogen gas, which is discharged through a source gas outlet 43.

Variant

The configurations of the hydrogen generating apparatuses 1, 21, and 31 described in the Examples can be varied as necessary. For example, the configuration of Example 1 can be varied by altering the position and shape of the source gas flow channel 13 formed on the dielectric body, within the scope in which an electric discharge can be effected within the source gas flow channel 13. As for the grounding electrode and high-voltage electrode in Examples 1 to 3, it is sufficient that either one functions as a high-voltage electrode and the other as a grounding electrode, and the material of the electrodes, the arrangement of the high-voltage power supply and insulating spacer etc. may be altered as necessary. In the hydrogen generating apparatus 31 employing the cylindrical plasma reactor 32 as described in Example 3, the catalyst 41 need only be arranged upstream of the hydrogen separating membrane 34, and it is possible to, for example, support or coat the catalyst on the outer surface of the hydrogen separation membrane 34. It is also possible to fill the source gas flow channel 36 between the plasma reactor 32 and the hydrogen separation membrane 34 with the catalyst 30 in pellet form as applied in Example 2.

DESCRIPTION OF THE REFERENCE NUMERALS 1, 21, 31 hydrogen generating apparatus
2 dielectric body
3 electrode
4 hydrogen flow channel plate
5 hydrogen separation membrane (grounding electrode)
6 high-voltage power supply
9 insulating spacer
10, 30, 41 catalyst
11 first surface
13, 26, 36 source gas flow channel
14, 38 source gas inlet
15, 43 source gas outlet
16 channel sections of the source gas flow channel
17 return channel sections of the source gas flow channel
18, 27, 37 hydrogen flow channel
19, 28, 39 hydrogen outlet
22, 32 plasma reactor (dielectric body)
23 catalyst tube
24, 34 hydrogen separation membrane (high-voltage electrode)
25, 42 grounding electrode
40 high-voltage electrode

What is claimed is:

1. A hydrogen generating apparatus comprising:
   a dielectric body defining a source gas flow channel;
   a catalyst configured to decompose at least part of a source gas that flows through the source gas flow channel to generate a hydrogen gas;
   an electrode arranged in contact with the dielectric body;
   a hydrogen separation membrane facing the electrode across the dielectric body;
   a hydrogen flow channel configured to guide the hydrogen gas separated by the hydrogen separation membrane; and
   a power supply configured to apply a bipolar pulse waveform to either of the hydrogen separation membrane and the electrode to cause a dielectric barrier discharge between the hydrogen separation membrane and the electrode.

2. The hydrogen generating apparatus according to claim 1, wherein:
   the source gas flow channel is formed as a groove in a surface of the dielectric body, the dielectric body being tabular;
   the catalyst is in the form of a thin film and covers an opening of the groove; and
   the hydrogen separation membrane is laminated on the catalyst.

3. The hydrogen generating apparatus according to claim 2, wherein the hydrogen separation membrane is configured to separate the hydrogen gas generated from the source gas and introduce the hydrogen gas into the hydrogen flow channel.

4. The hydrogen generating apparatus according to claim 1, wherein:
   the dielectric body is cylindrical;
   the electrode is arranged in contact with the outside surface of the dielectric body;
   the hydrogen separation membrane is arranged concentrically inside of the dielectric body, such that the source gas flow channel is defined between the dielectric body and the hydrogen separation membrane;
   the catalyst is arranged at a position upstream of the hydrogen separation membrane in the source gas flow channel; and
   the hydrogen separation membrane is configured to separate the hydrogen gas generated from the source gas through the dielectric barrier discharge or catalysis and introduce the hydrogen gas into the hydrogen flow channel.

5. The hydrogen generating apparatus according to claim 1, wherein the source gas is ammonia.

* * * * *